(12) United States Patent
Benedetto

(10) Patent No.: US 11,400,376 B2
(45) Date of Patent: Aug. 2, 2022

(54) AI-GENERATED INTERNAL ENVIRONMENTS BASED ON EXTERNAL GEOMETRY

(71) Applicant: Sony Interactive Entertainment Inc., Tokyo (JP)

(72) Inventor: Warren Benedetto, Foothill Ranch, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 287 days.

(21) Appl. No.: 16/661,768

(22) Filed: Oct. 23, 2019

(65) Prior Publication Data

US 2021/0121781 A1 Apr. 29, 2021

(51) Int. Cl.
*A63F 13/65* (2014.01)
*A63F 13/35* (2014.01)
*G06T 17/05* (2011.01)

(52) U.S. Cl.
CPC .............. *A63F 13/65* (2014.09); *A63F 13/35* (2014.09); *G06T 17/05* (2013.01); *A63F 2300/5526* (2013.01); *A63F 2300/69* (2013.01)

(58) Field of Classification Search
CPC .. A63F 13/65; A63F 13/35; A63F 2300/5526; A63F 2300/69; G06T 17/05
See application file for complete search history.

(56) References Cited

U.S. PATENT DOCUMENTS

| | | | |
|---|---|---|---|
| 7,038,694 B1 | 2/2006 | Santadomingo et al. | |
| 10,102,670 B2 * | 10/2018 | Ren | G06T 17/05 |
| 10,157,498 B2 * | 12/2018 | Zou | G06T 17/00 |
| 11,043,026 B1 * | 6/2021 | Fathi | G06N 20/00 |
| 2005/0171754 A1 | 4/2005 | Santodomingo et al. | |
| 2005/0202862 A1 | 9/2005 | Shuman et al. | |
| 2012/0194517 A1 * | 8/2012 | Izadi | G06T 7/20 345/420 |

(Continued)

OTHER PUBLICATIONS

PCT/US2020/057178, Notification of Transmittal of the International Search Report and the Written Opinion of the International Searching Authority, or the Declaration, PCT/ISA/220, and the International Search Report, PCT/ISA/210, dated Jan. 19, 2021.

(Continued)

*Primary Examiner* — William H McCulloch, Jr.
*Assistant Examiner* — Ankit B Doshi
(74) *Attorney, Agent, or Firm* — Penilia IP, APC

(57) ABSTRACT

A method is provided, including the following operations: receiving a request to initiate gameplay of a video game, the gameplay being configured to occur in a virtual environment resembling a requested real-world location; responsive to the request, obtaining exterior data associated to the requested real-world location, the exterior data describing external structures of physical objects in the requested real-world location; using a trained machine learning model to infer interior data for the physical objects based on the exterior data, the interior data describing inferred internal structures of the physical objects; generating the virtual environment using the exterior data and the interior data; initiating gameplay of the video game in the generated virtual environment.

16 Claims, 11 Drawing Sheets

(56) References Cited

U.S. PATENT DOCUMENTS

| | | | | |
|---|---|---|---|---|
| 2015/0178972 | A1* | 6/2015 | Barcay | G06T 17/05 |
| | | | | 345/419 |
| 2017/0039765 | A1* | 2/2017 | Zhou | G06T 7/55 |
| 2017/0365102 | A1* | 12/2017 | Huston | G02B 27/017 |
| 2018/0053343 | A1* | 2/2018 | Ren | G06T 11/001 |
| 2018/0107269 | A1* | 4/2018 | Benzies | G06F 3/0346 |
| 2019/0270015 | A1* | 9/2019 | Li | A63F 13/65 |

OTHER PUBLICATIONS

Chaillou: "ArchiGAN: a Generative Stack for Apai In lent Building Design", NVIDIA Developer Blog, Jul. 17, 2019, XP055765547, URL: https://developer.nvidia.com/blog/archigan-generative-stack-apartment-building-design/.

Wang et al., "Deep convolutional priors for indoor scene synthesis", ACM Transactions on Graphics, I 37, No. 4, Oct. 8, 2019, pp. 1-14, XP055765509, ISSN:0730-0301, DOOI: 10.1145/3197517. 3201362.

Summerville et al., "Procedural Content Generation via Machine Learning (PCGML)", ARXIV.org, Cornell University Library, NY, Feb. 2, 2017, XP0880746389, DOI: 10.1109/TG.2018.2846639.

* cited by examiner

AI-GENERATED INTERNAL ENVIRONMENTS BASED ON EXTERNAL GEOMETRY

FIELD OF THE DISCLOSURE

The present disclosure relates to systems and methods for using machine learning to generate internal environments based on external 3D geometry.

BACKGROUND

Description of the Related Art

A current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

Modern three-dimensional (3D) mapping technology has enabled generation of 3D maps of real-world locations. Such 3D maps can be constructed based on satellite imagery, GPS data, locally captured images, etc. Using 3D maps, it is possible to virtually view a real-world location, with a view provided from a perspective in the real-world location. For example, using 3D maps it is possible to virtually "walk down a street," viewing imagery captured from the corresponding real-world location as if one were actually present at the real-world location.

It is within this context that embodiments of the disclosure arise.

SUMMARY OF THE DISCLOSURE

Implementations of the present disclosure provide systems and methods for using machine learning to generate internal environments based on external 3D geometry.

In some implementations, a method is provided, including the following operations: receiving a request to initiate gameplay of a video game, the gameplay being configured to occur in a virtual environment resembling a requested real-world location; responsive to the request, obtaining exterior data associated to the requested real-world location, the exterior data describing external structures of physical objects in the requested real-world location; using a trained machine learning model to infer interior data for the physical objects based on the exterior data, the interior data describing inferred internal structures of the physical objects; generating the virtual environment using the exterior data and the interior data; initiating gameplay of the video game in the generated virtual environment.

In some implementations, the exterior data includes external three-dimensional geometry of the physical objects.

In some implementations, the exterior data includes external image data associated to surfaces of the external three-dimensional geometry.

In some implementations, the interior data includes inferred internal three-dimensional geometry of the physical objects.

In some implementations, the physical objects include a plurality of buildings; wherein the exterior data describes exterior surfaces of the buildings; wherein the interior data describes interior layouts and interior furnishings of the buildings.

In some implementations, the generated virtual environment enables the gameplay to include interactivity with the interior layouts and the interior furnishings of the buildings.

In some implementations, the trained machine learning model further infers the interior data based on geolocation data associated to the real-world location.

In some implementations, the geolocation data identifies one or more of a country, state, city, town, or neighborhood.

In some implementations, the generated virtual environment simulates the requested real-world location.

In some implementations, a non-transitory computer-readable medium is provided having program instructions embodied thereon that, when executed by at least one computing device, cause said computing device to perform a method including the following operations: receiving a request to initiate gameplay of a video game, the gameplay being configured to occur in a virtual environment resembling a requested real-world location; responsive to the request, obtaining exterior data associated to the requested real-world location, the exterior data describing external structures of physical objects in the requested real-world location; using a trained machine learning model to infer interior data for the physical objects based on the exterior data, the interior data describing inferred internal structures of the physical objects; generating the virtual environment using the exterior data and the interior data; initiating gameplay of the video game in the generated virtual environment.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Three-dimensional (3D) maps of real-world locations provide an engaging way to explore regions of the real world. However, while such 3D maps afford views of the exteriors of buildings and other objects at real-world locations, they generally do not capture the interiors of such objects, as they are principally constructed based on external views captured from public places or other lawful locations. Thus, while it is possible to construct a virtual environment for a video game using a 3D map of a real-world location, such a virtual environment would not include the interior structures of buildings or other objects.

In view of the above, implementations of the present disclosure provide systems and methods whereby a machine learning model is employed to infer the interior structures of buildings and other objects, based on known information about the buildings/objects such as their 3D geometry and appearance. In the case of buildings such as houses, offices, stores, etc., these inferred interior structures can include the layouts/floorplans and furnishings which are in accordance with the style and purpose of the building, the local region, and other aspects pertinent to the building's design. A virtual environment that resembles the real-world location can thus be generated incorporating the 3D map and the inferred interior structures, which can be used for interactive gameplay of a video game. In such a virtual environment, interactivity with the virtual environment can include viewing of, and entry into, the inferred interior structures of the buildings and other objects. Though the interiors are inferred, and therefore not exactly the same as the actual physical interiors of the real-world buildings, they are nonetheless configured to be consistent with what is real. Thus, the user is afforded an experience of interacting in a virtual environment resembling a requested real-world location, with the ability to explore the interiors of buildings and other objects in a way that is believable and consistent with the real-world location, even though information depicting such interiors is not directly available.

Figure 1:
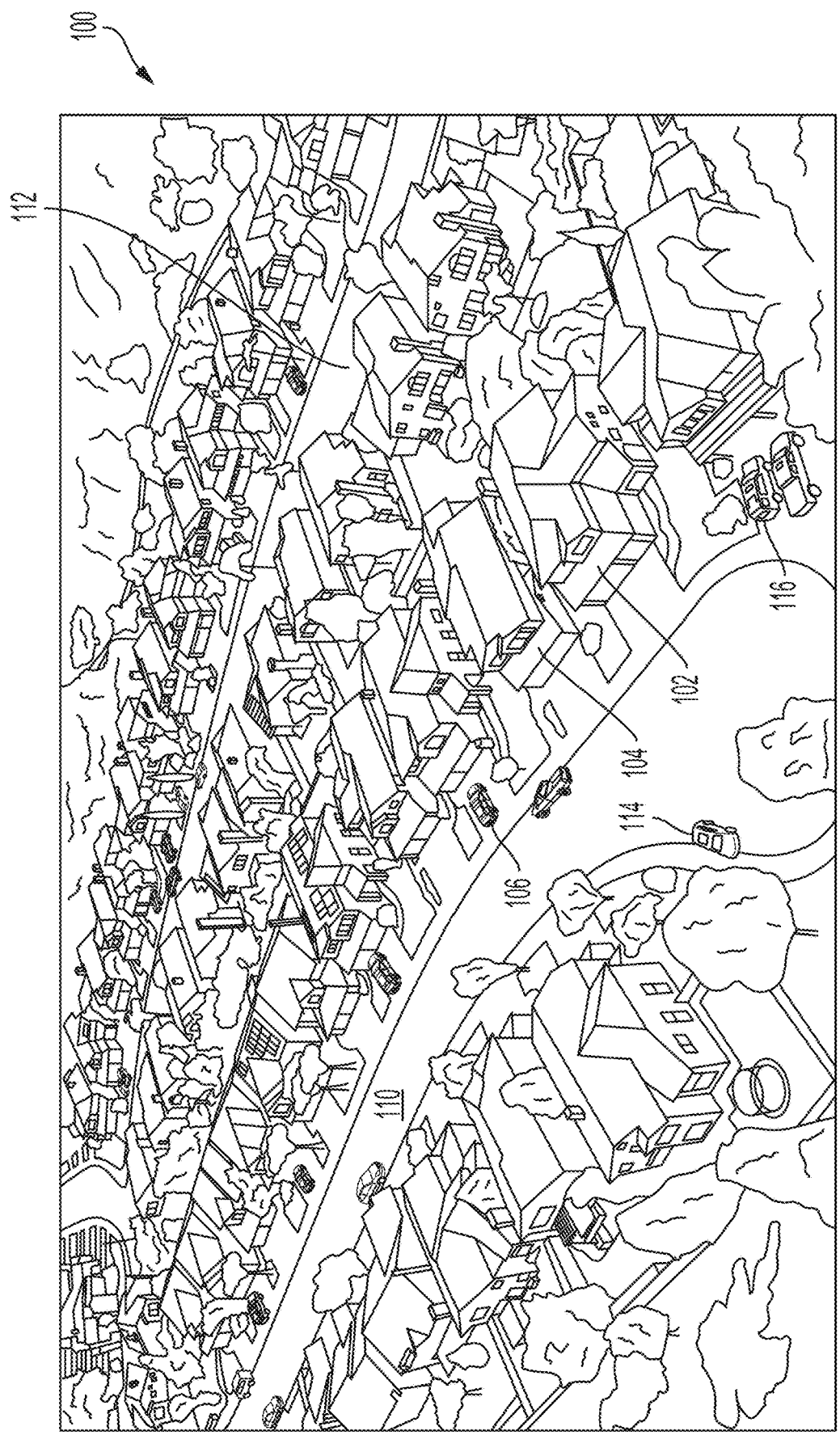
FIG. 1 illustrates an overhead perspective view from a 3D map of a real-world location, in accordance with implementations of the disclosure.

FIG. 1 illustrates an overhead perspective view from a 3D map of a real-world location, in accordance with implementations of the disclosure. The view provided is of a real-world location 100, which in the illustrated implementation is set in a residential neighborhood. As can be seen, the 3D map shows the presence of houses 102, 104, and 106, roads 110 and 112, as well as vehicles 114 and 116, and other objects which are visible. It will be appreciated that a residential neighborhood is merely one example of a real-world location, and that any real-world location can be applied in accordance with the principles of the present disclosure.

A 3D map such as that shown can be generated from images taken of the real-world location, such as satellite images, survey images taken from aircraft, images captured from the ground locally such as by mapping vehicles driven on the roads, images captured by individual persons, or any other images of the real-world location which can be correlated to their perspective locations. Photogrammetry techniques can be applied to such images to generate the 3D map. Broadly speaking, a 3D map can include 3D geometry information that describes the topography of the land and the 3D exterior structure of objects such as buildings, vehicles, trees, landmarks, etc. It will be appreciated that 3D geometry information can be in the form of a point cloud, polygon mesh (e.g. triangular mesh), wireframe model, or any other type of 3D representation system that enables construction of 3D models/maps of real-world places and objects. A 3D map as defined herein is essentially a 3D model of a real-world location.

The 3D map can include surface textures/imagery that are applied to the visible surfaces of objects in accordance with their 3D geometry. For example, portions of the aforementioned captured images can be applied to the corresponding surfaces of a 3D geometric representation of an object. By way of example without limitation, in the illustrated implementation, the houses (e.g. 102, 104, 106) have 3D geometry/structure, that may have been determined using photogrammetry. For a given house, the 3D geometry can define a 3D model of the house, and further defines various surfaces of the house. To these surfaces, corresponding image portions can be applied or "painted" as surface textures, thereby yielding a 3D model that appears realistic.

It will be appreciated that the 3D map is correlated to specific location information, which can be in the form of coordinates or other geo-positioning identifiers which can accurately identify a particular location in the real world. The structures of the 3D map are correlated to real-world positions which they depict.

Figure 2:
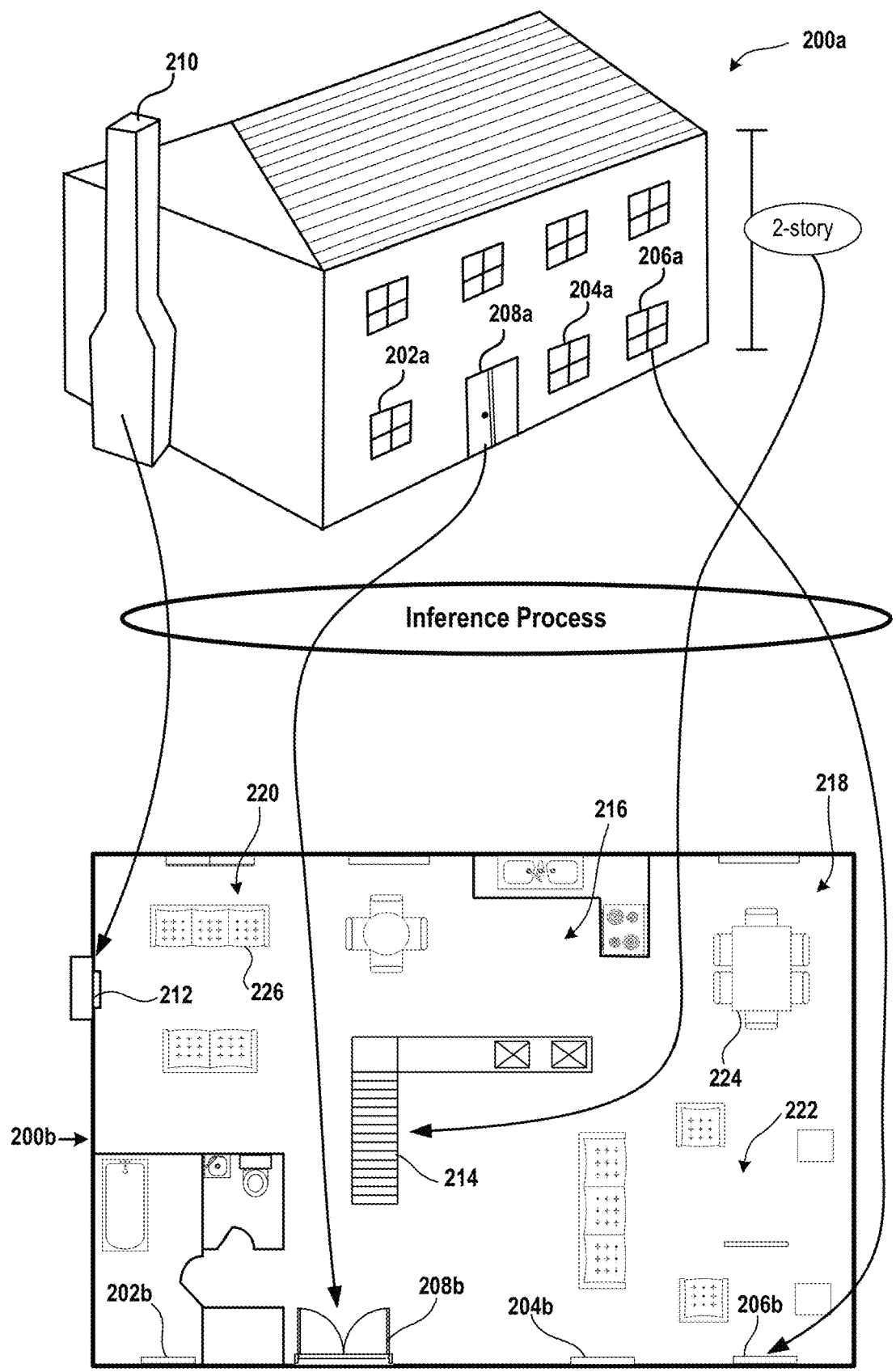
FIG. 2 conceptually illustrates an inferential process wherein a 3D structure is analyzed to infer its interior, in accordance with implementations of the disclosure.

FIG. 2 conceptually illustrates an inferential process wherein a 3D structure is analyzed to infer its interior, in accordance with implementations of the disclosure. In the illustrated implementation in particular, the interior of a house is inferred based on the exterior features of the house. At reference 200a a perspective view of the exterior of a house is shown. As can be seen, the house includes various features, such as windows 202a, 204a, and 206a, as well as a front door 208a. There is a second set of windows above these, and a chimney 210 is visible from the exterior. Based on these and other external features of the house, then the interior of the house can be inferred by a machine learning model that has been appropriately trained.

For purposes of illustration, an example floorplan view is shown at reference 200b, illustrating an interior layout and features that could be inferred based on the exterior of the house. It will be appreciated that the house may be determined to be a two-story house, for example based on determining the height of the house from its 3D geometry and/or the presence of the two sets of windows at different levels. Hence the interior space can be inferred as having a first floor and a second floor. The illustrated floorplan shown at reference 200b conceptually illustrates an inferred interior for the first floor, and the present description of its features demonstrates how internal features can be extrapolated from external features.

It will be appreciated that the inferred interior will have dimensions that fit within the exterior dimensions of the house, e.g. dimensions of walls and other internal architectural features configured to fit. That is, the dimensions of the interior including dimensions of specific rooms or spaces within the interior will be configured so as to account for the interior space that is available based on the exterior dimensions of the house. Furthermore, features such as windows and doors that are visible along the exterior will be placed at corresponding locations in the interior so as to match their externally visible locations. For example, windows 202a, 204a, and 206 as seen from the outside, have the same position in the interior floorplan, in which they are shown as corresponding windows 202b, 204b, and 206b, respectively. The presence of the chimney 210 visible on the exterior suggests that there will be a corresponding fireplace 212 visible from inside the house at the same position.

As noted above, the house can be determined to be a two-story house, and thus it can further be inferred that there will be a stairwell 214 inside the house to provide access to the second story.

The layout of the rooms/spaces of the house interior can also be inferred, including placement of walls, doors, and other features to define the different spaces within the house. For example, it may be inferred that in houses having this shape and built in this geographical region at the time the house was constructed, the kitchen is located in the rear of the house. And thus, the kitchen 216 is positioned at the back of the house as shown. The dining room 218 can be inferred as typically located adjacent to the kitchen 216. The location of the chimney 210, and by extension the fireplace 212, may suggest the location of the family room 220 being positioned so as to include the fireplace 212, as it may be inferred that the fireplace 212 is part of the family room. Additionally, the location of the living room 222 can be inferred, possibly in part based on the locations of the other rooms. It may be inferred that there is a bathroom or powder room on the first story. It will be appreciated that the presently described implementation is merely one example representative of how the interior layout of a building can be inferred based on various external factors.

Furthermore, the furnishings in the rooms of the house can also be inferred by a trained machine learning model. For example, the family room 220 may be likely to have a couch 226, and the dining room 218 can be expected to have a dining table 224. The specific placement of furnishings within rooms can also be inferred so that such furnishings are appropriately placed. It will be appreciated that the selection of furnishings by the machine learning model can be configured to have a cohesive style, and this may be based on factors such as a determined architectural style of the house, the geographical location of the house, the time era (as discussed further below) of the rendering of the interior, etc. It will be appreciated that the foregoing is merely one example of how furnishings in a building may be inferred.

Figure 3:
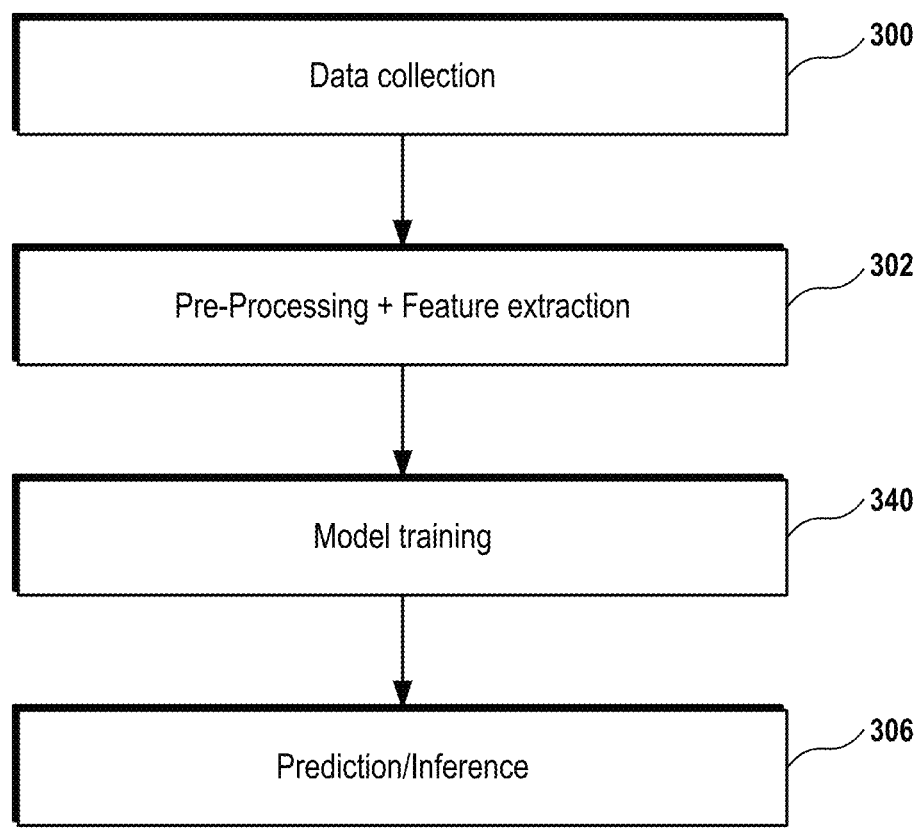
FIG. 3 illustrates a method for training a machine learning model to infer the interior of an object such as a building from a 3D map, in accordance with implementations of the disclosure.

FIG. 3 illustrates a method for training a machine learning model to infer the interior of an object such as a building from a 3D map, in accordance with implementations of the disclosure. At method operation 300, a data collection process is performed. That is, a corpus of data is obtained that includes 3D structures from 3D maps and data describing their known interior structures, including interior layouts and furnishings. While the 3D structures referenced herein primarily include buildings, they may also include any other objects that may appear on a 3D map and for which an interior can be inferred, such as vehicles (e.g. cars, trucks, motorhomes/RV's, trailers, planes, boats, etc.), tunnels, tents, covered structures, etc. It will be appreciated that corresponding data about the interiors of such objects is included in the corpus of data, as this will be used to train the machine learning model.

After the data is acquired, then at method operation 302, a pre-processing and feature extraction process is performed. Features which are to be used as predictive indicators/factors for inference/prediction by the machine learning model can be determined and processed. And features which are to be inferred/predicted can also be determined and processed. It will be appreciated that the scope of the specific features which are to be considered can include any features which are indicative or suggestive or which can otherwise be used to infer the interior of an object. Likewise, the scope of the features which are to be inferred can include any aspect of the interior which can be rendered for the object.

By way of example without limitation, various features which can be used as predictive factors for inferring an interior of an object, such as a building, include: geographic location (e.g. country, state, city, neighborhood, coordinates, etc.), local terrain, exterior dimensions, exterior shape, color, architectural style (e.g. tudor, colonial, mission, farmhouse, modern, etc.), age or date of construction, type of property (e.g. residential, single-family, townhouse, condominium, apartment, commercial, mall, retail, office, dining/ restaurant, grocery, entertainment, educational, school, university, public, government, judicial, library, museum, movie theater, performing arts, theater, sporting, arena, stadium, religious, church, synagogue, mosque, etc.), locations and types of external features (e.g. doors, windows, shutters, chimneys, siding, roofing, garage doors, vents, skylights, solar panels, porch, balcony, planter box, etc.), or any other feature or factor which can be predictively used to infer the interior.

In some implementations, the floorplan/layout of a given building might be known. Or a specific selection of floorplans/layouts may be applicable to a given community, and thus a given house in the community will be likely to have one of the available floorplans. This information can be utilized for purposes of generating the interior environment.

In some implementations, additional sources of related information about a real-world location can be utilized for purposes of inferring interior environments. For example, property information, pictures (exterior and interior), transaction history, etc. could be obtained from additional source such as a real-estate information website. Information about a locale could be obtained from a government website, social media site, local news site, etc.

By way of example without limitation, various interior features which can be inferred include: layout/arrangement/ floorplan/dimensions of rooms and spaces (e.g. kitchen, dining, family, living, bathroom, bedroom, library/study, foyer, closet, office, hallway, stairs, common area, lobby, conference room, basement, etc.), positions and types of interior architectural features/appliances (e.g. doors, windows, lights, counters, cabinets, stove, oven, refrigerator, washer, dryer, sinks, toilets, elevator, escalator, etc.), positions and types of various fixtures and furnishings in the interior can be inferred (e.g. table, chair, stool, sofa/couch, desk, bed, cabinet, dresser, bookshelf, media stand, television, speaker, lamp, picture frames, etc.), positions and types of articles typically found in the given object/building (e.g. in the case of a house—clothing, books, dining ware, etc.), or any other aspect of the interior which can be inferred and rendered.

The data pre-processing can include quantification and classification to express features appropriately for the machine learning model (e.g. numerically, as multi-dimensional vectors, etc.). And the feature extraction can include a dimension reduction process to reduce dimensionality. The result of pre-processing and feature extraction is a set of training data which can be applied to train the machine learning model.

At method operation 304, the machine learning model is trained using the training data. It will be appreciated that various types of machine learning models can be employed in accordance with various implementations of the disclosure. By way of example without limitation, the machine learning can be supervised learning, unsupervised learning, reinforcement learning, and may further be a deep learning model employing deep neural networks. By training the machine learning model using the training data, then the machine learning model becomes trained to infer the interiors of objects in a 3D map based on external features and related information. And in particular, the trained machine learning model can infer the interiors of buildings, including interior layouts/geometry and furnishings, architectural style, etc., based on understanding external geometry and features, location, and other information about the buildings.

At method operation 306, the trained machine learning model is applied to infer or predict the interiors of objects from a particular selected region of a 3D map. The selected region can be a particular region of the real-world, and though the interiors that are generated by the machine learning model are not exactly the same as the actual interiors (which are not known), they will feel consistent with reality when viewed by the user. The selected region of the 3D map, including both its exterior and interior rendering, can be used for purposes of playing a video game, thereby enabling users to game in real-world locations, while also being able to view and enter buildings or other objects, wherein such interiors have been inferred from exterior data.

Figure 4:
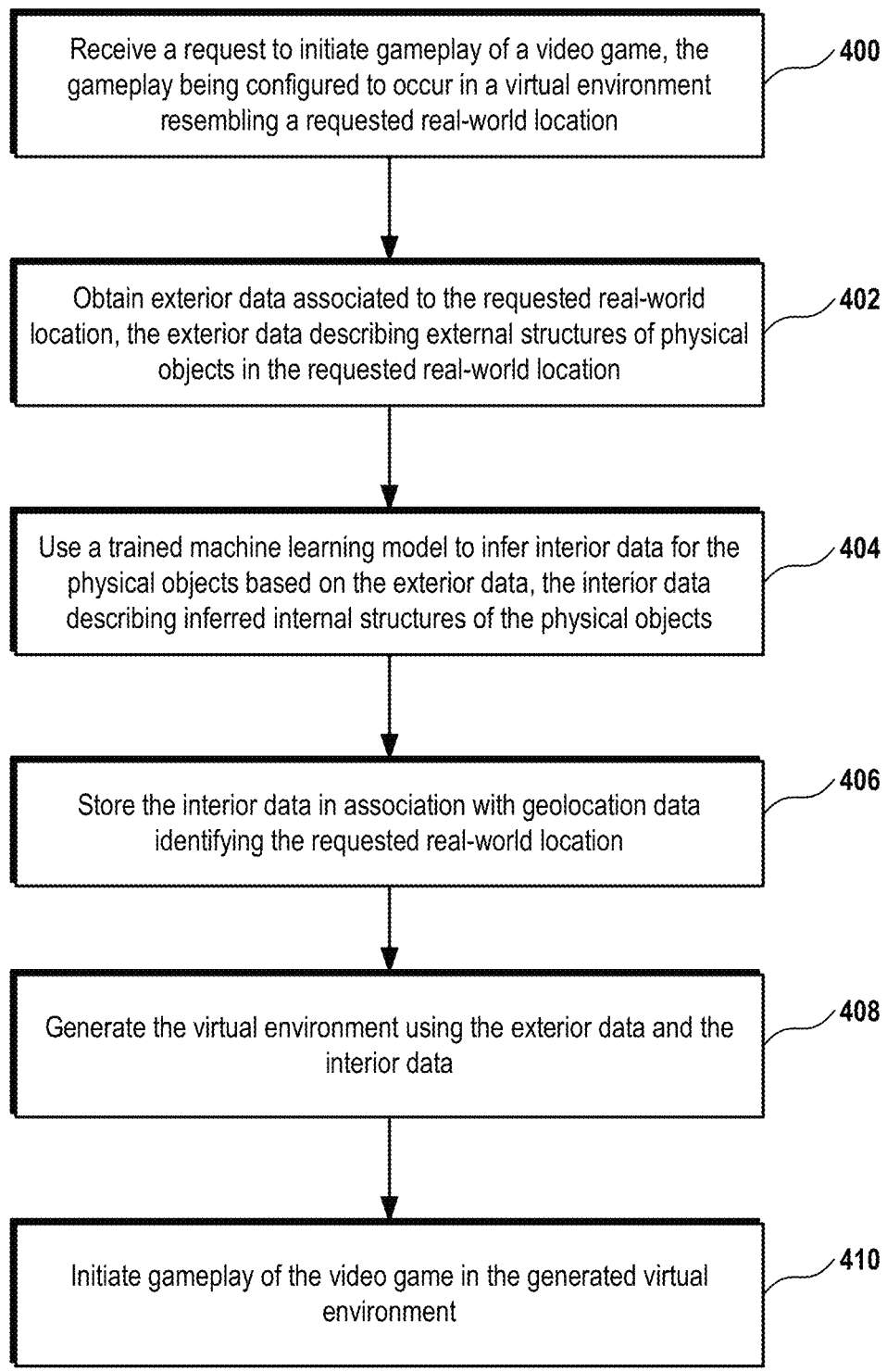
FIG. 4 illustrates a method for generating a virtual environment for gameplay based on a real-world 3D mapped location, in accordance with implementations of the disclosure.

FIG. 4 illustrates a method for generating a virtual environment for gameplay based on a real-world 3D mapped location, in accordance with implementations of the disclosure. At method operation 400, a request to initiate gameplay of a video game is received, wherein the gameplay is configured to occur in a virtual environment resembling a requested real-world location. For example, the user may request to play the video game in their neighborhood or town, a specific city, etc. In some implementations, the user may identify a particular address or landmark or other geographic location identifier, such that gameplay is to occur in the local vicinity.

Responsive to the request, at method operation 402, exterior data associated to the requested real-world location is obtained, wherein the exterior data describes external structures of physical objects in the requested real-world location. The exterior data can be obtained from a 3D mapping service or other repository of 3D map data. The exterior data can include 3D geometry/topography of real-world objects, images of said objects, and other information about such objects that are correlated to their real-world locations (e.g. geo-coordinates).

At method operation 404, a trained machine learning model is used to infer interior data for the physical objects based on the exterior data, wherein the interior data describes inferred internal structures of the physical objects. For example, the interior data can define the interior layout or floorplan of a building, as well as furnishings and their positions within the building.

At method operation 406, the interior data is stored in association with geolocation data identifying the requested real-world location. That is, the interior data is correlated to its real-world location, so that when future requests are made for gameplay in that real-world location, then the interior data is retrieved from storage so that the interior data does not need to be generated again. In some implementations, the interior data is timestamped, and the interior data for the real-world location is regenerated if it either does not exist, or if the existing interior data is older than a predefined age (e.g. older than x number of months, or years, etc.).

Then at method operation 408, the virtual environment is generated using the exterior data and the interior data. It will be appreciated that the virtual environment will have the look and feel of the real-world location, as it is based on the 3D mapped real-world location, but will also include renderings of the interiors of buildings and other objects. Thus, a user (or character controlled by the user) will be able to enter and view the interiors that have been generated as presently described, which would not have been possible based on the 3D mapping data alone. In some implementations, the 3D mapping data is imported into, or processed/converted for use by, a game engine, and the interior data is then generated accordingly for use by the game engine as well.

In other implementations, the interior data is generated based on the native 3D mapping data and in accordance with the 3D mapping data's configuration (e.g. to be compatible with a 3D mapping service that provides the 3D map data). In some implementations, the game engine is configured to use this 3D mapping data and generated interior data directly to generate the virtual environment, whereas in other implementations, the exterior/interior data is processed for compatibility with the game engine.

At method operation 410, gameplay of the video game is initiated in the generated virtual environment. In various implementations, the gameplay can be single-player or multiplayer, enabling users to view and interact with both exterior and interior portions of buildings/objects in a virtual environment that simulates a real-world location. It will be appreciated that the particular interactions available to the users will depend upon the player mechanics of the video game. For example, players can parachute into a particular neighborhood, walk/run or drive vehicles (e.g. cars, trucks, etc.) on the streets, fly aircraft through the neighborhood, etc. It will be appreciated that objects in the virtual environment can be destructible, alterable or otherwise changed, and that such changes can be persistent so that later players interacting in the same vicinity will experience the same changes. Or in some implementations, objects are reset to a default state at a certain time, such as when a new session in the virtual environment is initiated, after a predefined period of time as elapsed, upon request, etc.

In other implementations, method operations 402, 404, 406, and 408 are not specifically performed in response to the request to initiate gameplay, but can be performed prior to the request. For example, the interior data may have been previously generated from a prior session, or previously generated as part of the game development process, such as being included as part of a downloadable map pack for the real-world location, etc.

Figure 5:
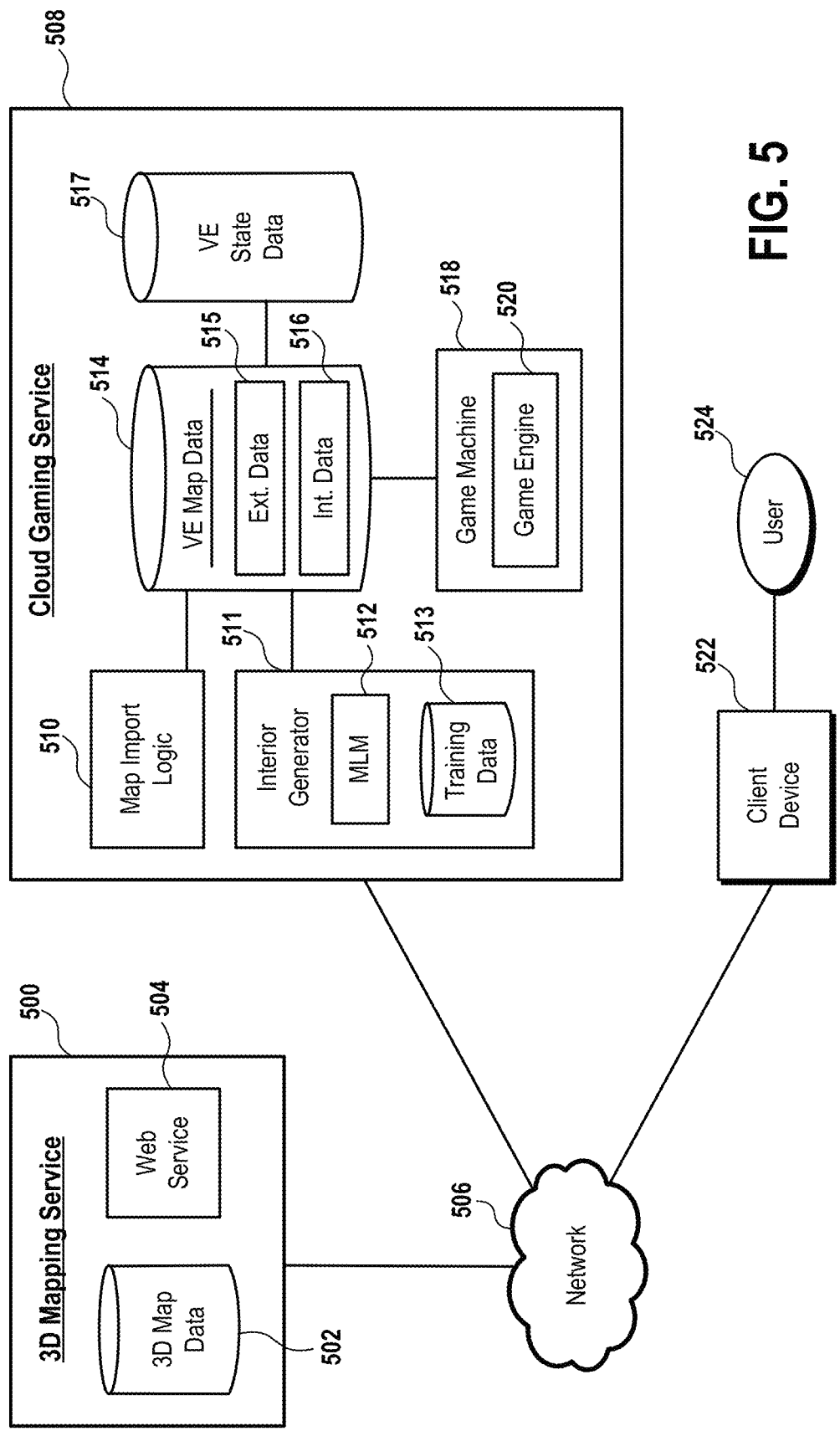
FIG. 5 illustrates a system for generating interiors based on external 3D map data, and providing a virtual environment for gameplay, in accordance with implementations of the disclosure.

FIG. 5 illustrates a system for generating interiors based on external 3D map data, and providing a virtual environment for gameplay, in accordance with implementations of the disclosure. It will be appreciated that various components of the system can be implemented over one or more server computers and/or other hardware having processors and memory. Additionally, the components may communicate over a network 506, which may include any of various local or wide area networks, wired or wireless, including the Internet.

A 3D mapping service 500 can be an online provider of 3D maps of real-world locations. The 3D map data 502 includes 3D geometry of the real-world locations, including the 3D geometry of objects such as buildings and other structures. In some implementations, the 3D map data further includes imagery of the real-world locations, portions of which can be applied to surfaces defined by the 3D geometry. The 3D mapping service further includes a web server 504 through which other entities may access services provided by the 3D mapping service, including access to the 3D map data 502. In some implementations, the 3D mapping service may use its 3D map data for various functions, including providing online or offline maps for general browsing and exploration, directions, navigation, advertising, reviews, etc. In some implementations, the web server 504 implements an API of the 3D mapping service, through which requests for data from the 3D map data 502 are received.

Also shown in the illustrated implementation is a cloud gaming service 508, which is configured to enable cloud gaming over the network 506. The cloud gaming service 508 as shown is configured to enable gameplay in virtual environments that simulate real-world locations. To provide a realistic experience, the cloud gaming service 508 is configured to generate interior structures based on external 3D geometry and other information known about a particular real-world location.

The map import logic 510 is configured to obtain 3D map data from the 3D mapping service 500, and import or process the 3D map data for use in a game engine of a video game, which is stored as part of the virtual environment map data 514. It will be appreciated that this portion of the virtual environment map data constitutes exterior data 515 representing the external 3D geometry and appearance (e.g. surface imagery) of real-world locations.

An interior generator 511 is configured to generate interiors of objects based on the exterior data. As described herein, a machine learning model 512 is trained to infer interior structure, related objects, etc., using training data 513. The trained machine learning model 512 is then applied to infer the interior data 516 based on the exterior data 515. It will be appreciated that the interior data 516 describes the internal 3D geometry of buildings and other structures/objects in the virtual environment and defines the placement of related items within the interiors. In some implementations, the interior data may reference art assets from an asset library, which may be used to define the structure and appearance of items, textures, surfaces or other rendered portions in the virtual environment.

The virtual environment map data 514, including the exterior data 515 and the interior data 516, are utilized to render a virtual environment for gameplay of a video game. It will be appreciated that the virtual environment simulates a real-world location. In some implementations, the video game is a cloud-based video game that is executed and streamed from the cloud gaming service 508. That is, the video game is executed by a cloud game machine 518, and more specifically includes a game engine 520 that renders the virtual environment for real-time gaming. Rendered video portraying a view (e.g. first-person view) of the virtual environment is streamed as video over the network 506 to a client device 522 operated by a user 524. The client device 522 is configured to present the video on a display, which may be separate from or integrated into the client device 522.

While a cloud gaming implementation is shown, it will be appreciated that in other implementations, the video game is executed locally, e.g. by client device 522, with the locally executed video game obtaining the virtual environment map data 514 over the network 506.

In some implementations, additional aspects of the virtual environment can be inferred. For example, machine learning model can be trained to infer materials of surfaces or objects and their properties. Thus, by way of example without limitation, a house might be more likely to be inferred as having a wood or carpet floor with its attendant properties, whereas a museum might be more likely to be inferred as having a stone floor with its attendant properties. By inferring a particular material, then related interactive aspects can also be affected. For example, there may be different sounds associated to different materials, such as the sound of footsteps being different on a wood floor versus a carpet floor versus a stone floor. Haptic feedback (e.g. vibration feedback provided through a controller device, or force feedback through a haptic glove interface, etc.) can also be different when interacting with the different materials. For example, haptic feedback can be different when virtually touching a carpeted surface versus a wood surface versus a stone surface. Physical surface texture can also be inferred (e.g. smooth versus rough surface texture), and haptic feedback can be configured to reflect the qualities of the physical surface texture when interacting with the surface (e.g. virtually touching a smooth surface will provide different haptic feedback than virtually touching a rough surface). The above-described sounds and haptic feedback which are determined from inferred materials and physical textures, can of course extend to any type of material (e.g. cloth, leather, wood, stone, metal, glass, plastic, etc.) or physical surface texture (e.g. smooth, rough, porous, corrugated, fibrous, etc.).

As noted herein, in some implementations, the virtual environment can be alterable, such as portions or items being destructible or moveable or otherwise changeable in some manner. In some implementations, the particular state of the virtual environment can be stored as virtual environment state data 517, which may define the states of objects in the virtual environment. For at least some portions or items, there may be a default state, with changes from the default state being recorded. The state of the virtual environment can be saved for a given user or session of the video game, and later retrieved when gameplay is continued. In some implementations, there is a global state of the virtual environment, so that all players of the video game see the same state; whereas for other sessions the state of the virtual environment can be individualized.

In some implementations, there is a global starting state, and a personalized delta indicating how the state has changed based on user actions in the virtual environment. For example, the environment can be destructible so that it is possible to break the glass in a building. In the initial starting state, the glass is not broken, but if it does get broken, then it will persist for that player. However, for another player or session, the glass will not be broken as it is reset to the initial state.

In some implementations, there are global features which are the same for all users, and user-customizable features which can vary from one user to the next.

In some implementations, the system may save interiors for a given user, so that each user sees an interior that is generated for them. Alternatively, the system may be configured so that once an interior is generated for a given location, it becomes global, so that everyone sees the same interior (subject to personalized changes if permitted). In this manner, the interiors do not need to be regenerated, but are stored and become persistent.

It will be appreciated that the game engine handles various aspects of 3D presentation, such as lighting effects. For example, as has been described, external geometry can be imported into a game engine and then used to generate the interior portions, and part of what gets generated in the interior portions may include light sources that vary depending upon the building. For example, a supermarket may tend to have fluorescent lights, whereas other types of buildings may tend to have incandescent lights. Such light sources may have various characteristics, such as brightness levels, color temperatures, positions, etc. It will be appreciated that the game engine is configured to handle the resulting lighting effects based on the inferred light sources.

Figure 6:
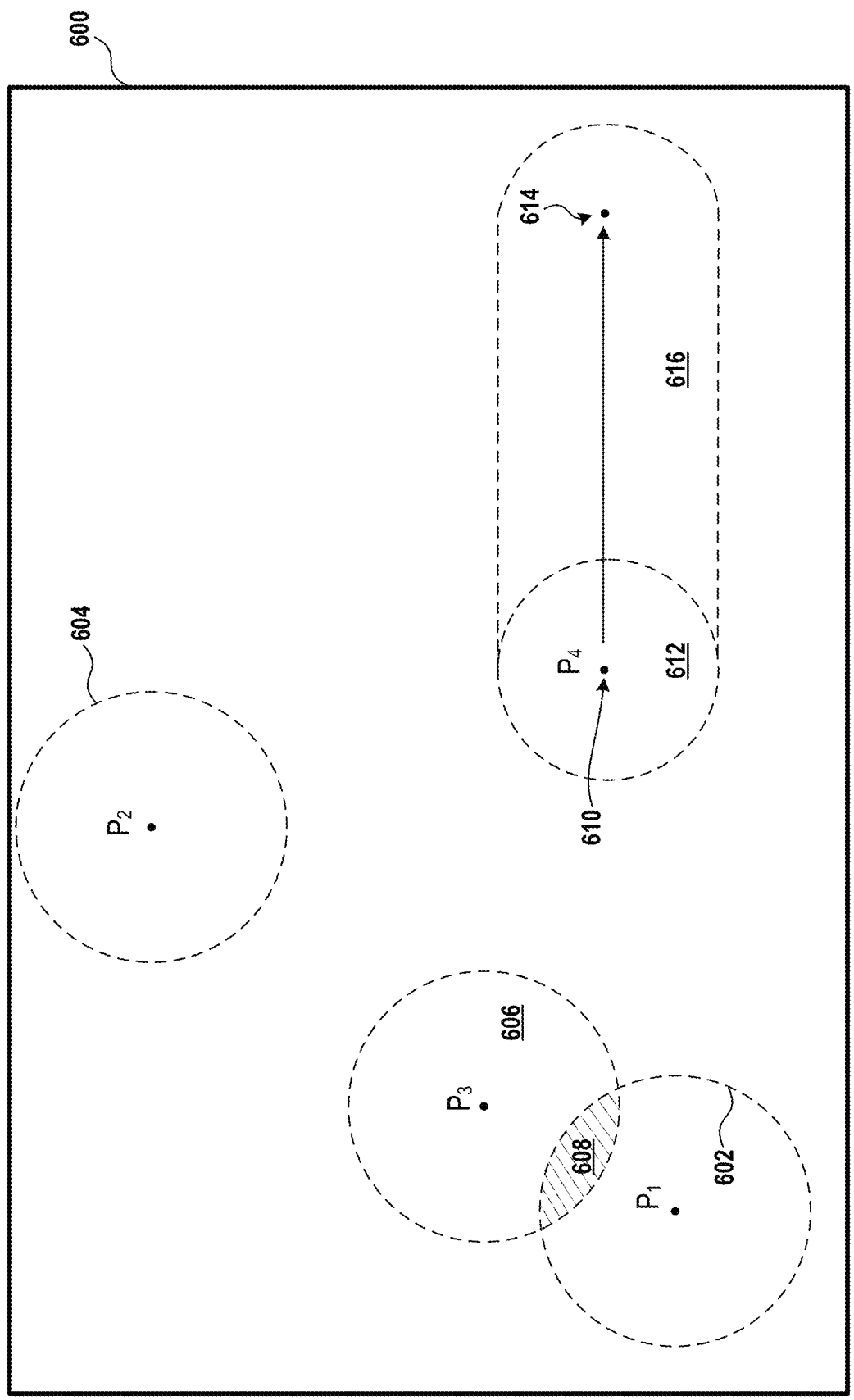
FIG. 6 conceptually illustrates the generation of various portions of a virtual environment, in accordance with implementations of the disclosure.

FIG. 6 conceptually illustrates the generation of various portions of a virtual environment, in accordance with implementations of the disclosure. In the illustrated implementation, a region 600 of the world is conceptually shown, representing a region for which exterior data for generating a corresponding virtual environment is available. Initially, the interior data for the region 600 has not been generated. In some implementations, the interior data is generated in response to user requests to engage in gameplay of a video game at particular real-world locations.

For example, a player P1 may request to initiate gameplay at a location in the region 600 as shown. Accordingly, a region 602 that is proximate to the requested location is identified and interior data is generated for the region 602. It will be appreciated that in various implementations, the proximate region for which interior data is generated and its specific boundary can be determined in various ways. In some implementations, the region 602 is determined to be the area within a predefined radius of the requested location. In some implementations, the region is determined as the local neighborhood, town, city, proximate block(s), local development, or any other identifiable or delineated area to which the requested location corresponds or in which the requested location exists. In some implementations, boundaries of the region 602 are identified and determined to coincide with existing boundaries in the local area, such as roads, bridges, property boundaries, railroad tracks, natural features (e.g. rivers, mountains, forests, etc.), or other identified features.

As noted, generated interior data can be stored, so that it need not be generated again. It will be appreciated that over time, as different users request different locations for gameplay, then the portion of the region 600 for which interior data has been generated will grow. For example, a player P2 may request to initiate gameplay at another location as shown, and therefore a corresponding region 604 may be identified, and interior data for the region 604 generated. The interior data for region 604 is thus added to the stored virtual environment map data, and over time the map area possessing corresponding interior data becomes more filled in.

When a user requests the same location as one for which interior data has already been generated then in some implementations, the existing interior data is retrieved from storage, rather than being generated again for the same location. In some implementations, partial generation is performed. For example, when a player P3 requests to engage in gameplay at a location as shown, then the proximate region includes a portion 608 of the previously generated region 602, and a portion 606 for which interior data is generated anew.

In some implementations, as a player moves within the virtual environment, then the interior data in the areas proximate to the player are generated accordingly. For example, the player P4 may be initially at a location 610, for which interior data is generated in a corresponding region 612. As the player P4 moves to location 614, so the interior data is additionally generated for the region proximate to the player P4 throughout the player's movement, resulting in generation of interior data for the region 616 as shown.

In some implementations, interior data is generated if needed prior to initiating gameplay in a given location. However, in other implementations, interior data can be generated while gameplay occurs. In some implementations, a sufficient predefined amount of interior data is obtained or generated to enable gameplay to be initiated (e.g. predefined region proximate to a requested initial location), and then as gameplay progresses, additional interior data can be generated simultaneous with the gameplay. For example, the system may generate the interior data in the background based on player location. In some implementations, if the interior of a given building is not ready yet, then the could be configured to keep a door or entrance to the building locked. And then when the interior of the building is ready, then the door or entrance would be unlocked.

In some implementations, the interior data generation is performed in an outward expanding manner, so that objects nearer to the player (e.g. a character controlled by the player) in the virtual environment are prioritized for interior generation over objects that are further from the player. In some implementations, objects proximate to the player are assigned a priority weighting that determines the order in which they are processed for interior generation, including such factors as distance from the player, direction and speed of movement of the player (e.g. vector movement), object type, etc. Such a weighting may take the form of a probability that an object in need of interior generation will be the next object sought to be accessed by the player. For example, a player moving in a given direction may be more likely to access a first object that is further away but along the player's directional course, than a second object that is closer but in the opposite direction from the player's movement. And hence the first object should be prioritized for interior generation over the second object.

Additionally, in various implementations, the processes for interior generation of the present disclosure can be performed at any time prior to the user's gameplay interaction with a particular region, and may even be part of the game development process. For example, a game developer may execute the interior generation process as part of a pre-rendering step for a downloadable map pack (e.g. for a given city/town or region). The developer could release a map of a given region as downloadable content (e.g. the San Mateo, Calif. map pack). Thus, the developer could utilize the processes of the present disclosure to generate the internal geometry as part of the game development process, with the resulting data being bundled into the downloadable map pack. Users could download the map pack and initiate gameplay, at which point they play using the previously-generated internal geometry.

Figure 7:
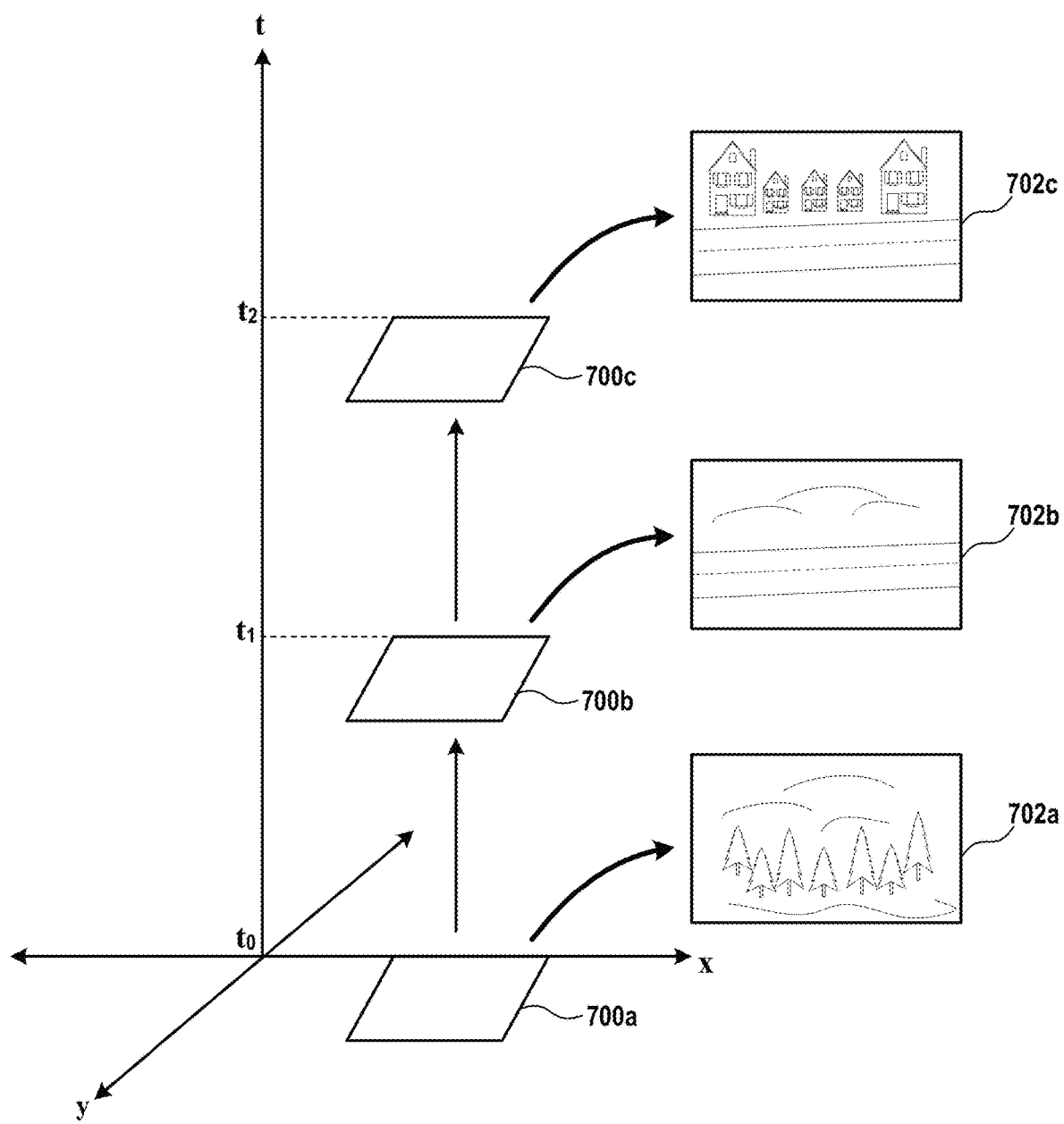
FIG. 7 conceptually illustrates a portion of a 3D map or virtual environment evolving over time, in accordance with implementations of the disclosure.

FIG. 7 conceptually illustrates a portion of a 3D map or virtual environment evolving over time, in accordance with implementations of the disclosure. As 3D maps and related virtual environments have been described herein, it will be appreciated that there is a temporal dimension to such representations of real-world locations. That is, a given 3D map of a particular location is representative of that location at a specific time/date at which the location was captured (e.g. through captured images or other sensed data). However, the structures and appearance of a given location can change over time. Thus, it can be useful to track the temporal aspect of the data and processes described herein.

For example, with continued reference to FIG. 7, a region 700a conceptually represents a real-world location at a time T0. Similarly, a region 700b conceptually represents the real-world location at a later time T1; and a region 700c conceptually represents the real-world location at a still later time T2. By way of example without limitation, at time T0, the location may appear as shown at reference 702a, as a forest landscape with many trees. Then at time T1, the location may appear as shown at reference 702b, now with the trees removed and a road constructed at the location. Then at time T2, the location may appear as shown at reference 702c, now with several buildings having been erected alongside the road. Changes such as these occur over time at a given location, changing the structures present and the appearance of the location.

Accordingly, in some implementations, there can be virtual environments corresponding to different eras or times in history for a given location. For example, 3D mapping data can be obtained at different times over the course of time (e.g. at regular intervals, once every x number of months or years, etc.) and a corresponding virtual environment generated in accordance with the principles of the present disclosure. Hence as time progresses, there will be different versions of a given location corresponding to different times, in which users may engage in gameplay. Thus, the user may not only choose the real-world location for gameplay of a video game, but also a time in history to render the location for the gameplay.

It will be appreciated that interiors which are inferred will be appropriate to the time or era being portrayed by the virtual environment. Accordingly, the machine learning model can be trained for different time periods to render appropriate interiors in accordance with the time periods, for example employing styles, designs, and items that are characteristic of the different eras.

Thus, there may be a global state of a given location that includes a time component. For example, there may be a single map version for each year, or month, decade etc. And when playing a video game, one plays in a particular single time version. However, to foster social interaction, it may be desirable to enable users playing in different time versions of the same location to interact.

Figure 8:
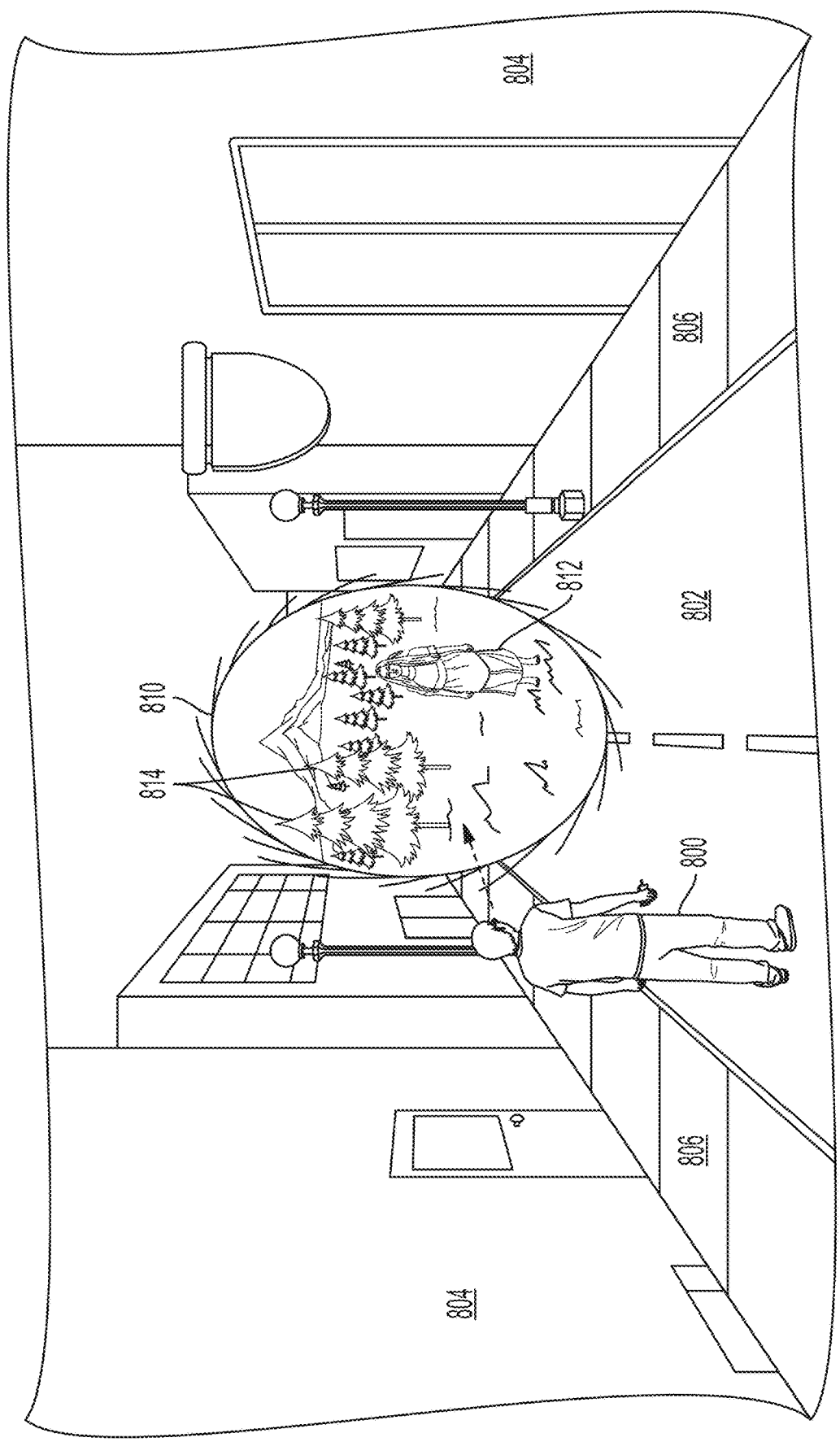
FIG. 8 conceptually illustrates users interacting in different time versions of a virtual environment with a time travel portal opened between them, in accordance with implementations of the disclosure.

FIG. 8 conceptually illustrates users interacting in different time versions of a virtual environment with a time travel portal opened between them, in accordance with implementations of the disclosure. In the illustrated implementation, a player character 800 (e.g. controlled by a first user) is shown interacting in a virtual environment in a modern time era, such that the location includes a street 802, sidewalks 806, and buildings 804. Simultaneously, another player character 812 (e.g. controlled by a second user) is interacting at the same location but in a different time era. Thus, to enable the users to interact with each other, a time travel portal 810 has opened up that enables the users to see each other in their respective virtual environments which are different time versions of the same location. As shown, the player character 812 is in a historical time era in which instead of a street or buildings, the landscape is undeveloped with many trees 814 present.

In some implementations, a player character may step through the time travel portal 810 and enter the other user's version of the virtual environment, thus experiencing a virtual time travel mechanic. In some implementations, users may receive notifications that indicate that a friend is playing in a nearby location but in a different time era. In some implementations, such notifications may further provide an option to open a time travel portal so that users may interact across different time eras of a given simulated real-world location.

It will be appreciated that for a given source of 3D map data of the world, there may be some areas with more sophisticated or developed geometries than others. For example, the 3D geometries for a highly populated city may be more developed than that of a small town in some instances. Therefore, in some implementations, not all locations may be available for gameplay. Limited regions or areas may be available for gameplay at a given time, but then expanded over time as more data and developed 3D mapping data for additional areas becomes available.

In some implementations, for regions with less developed external geometry, machine learning could also be applied to develop the external geometry of the local region. That is, a machine learning model could be trained to infer external 3D data about a region based on various pieces of data. For example, a given town may not have 3D mapping data describing external geometry available, but nearby towns do, and so a machine learning model could be trained using the 3D mapping data of the nearby towns, and then applied to infer that of the given town. For example, such a machine learning model could be trained to understand the kinds of districts that are present (e.g. a main street, business area, residential neighborhood, warehouse district, etc.) and the kinds of buildings/structures that would be present in such districts (e.g. office buildings, churches, homes, etc.) as well as their architectural styles and types of external appearances in the given geographical region. In some implementations, local images can be used to develop external geometry, such as images captured by mapping vehicles or other sources of local imagery.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 9A:
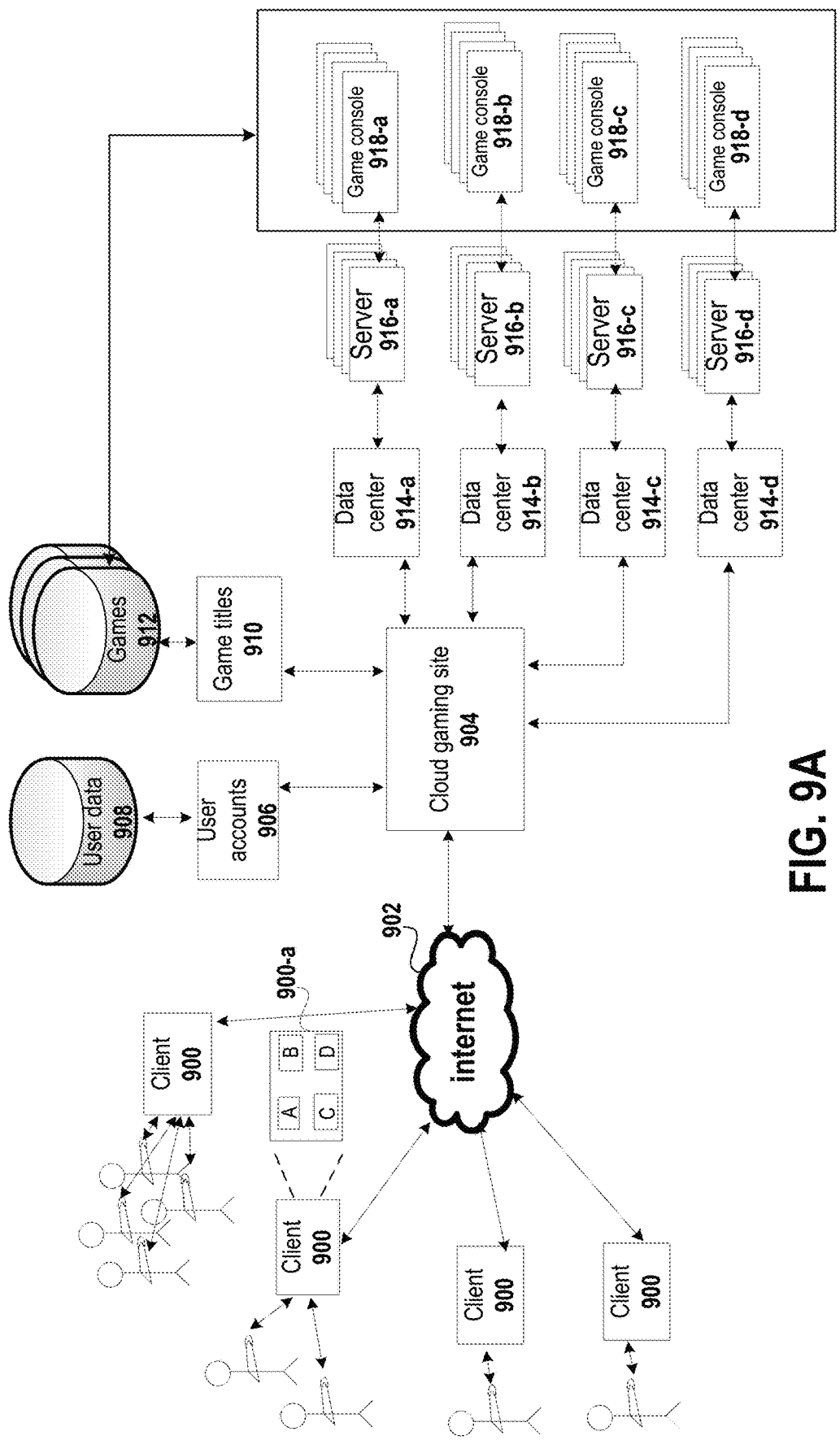
FIG. 9A illustrates an exemplary system used to load game files for a game available through a cloud gaming site, in accordance with implementations of the disclosure.

FIG. 9A illustrates an exemplary system used to load game files for a game available through a cloud gaming site. The system includes a plurality of client devices 900 that are communicatively connected to the cloud gaming site 904 over a network 902, which can include a LAN, wired, wireless, cellular (e.g. 4G, 5G, etc.), or any other type of data network, including the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900-*a*, as shown in FIG. 9A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 9B:
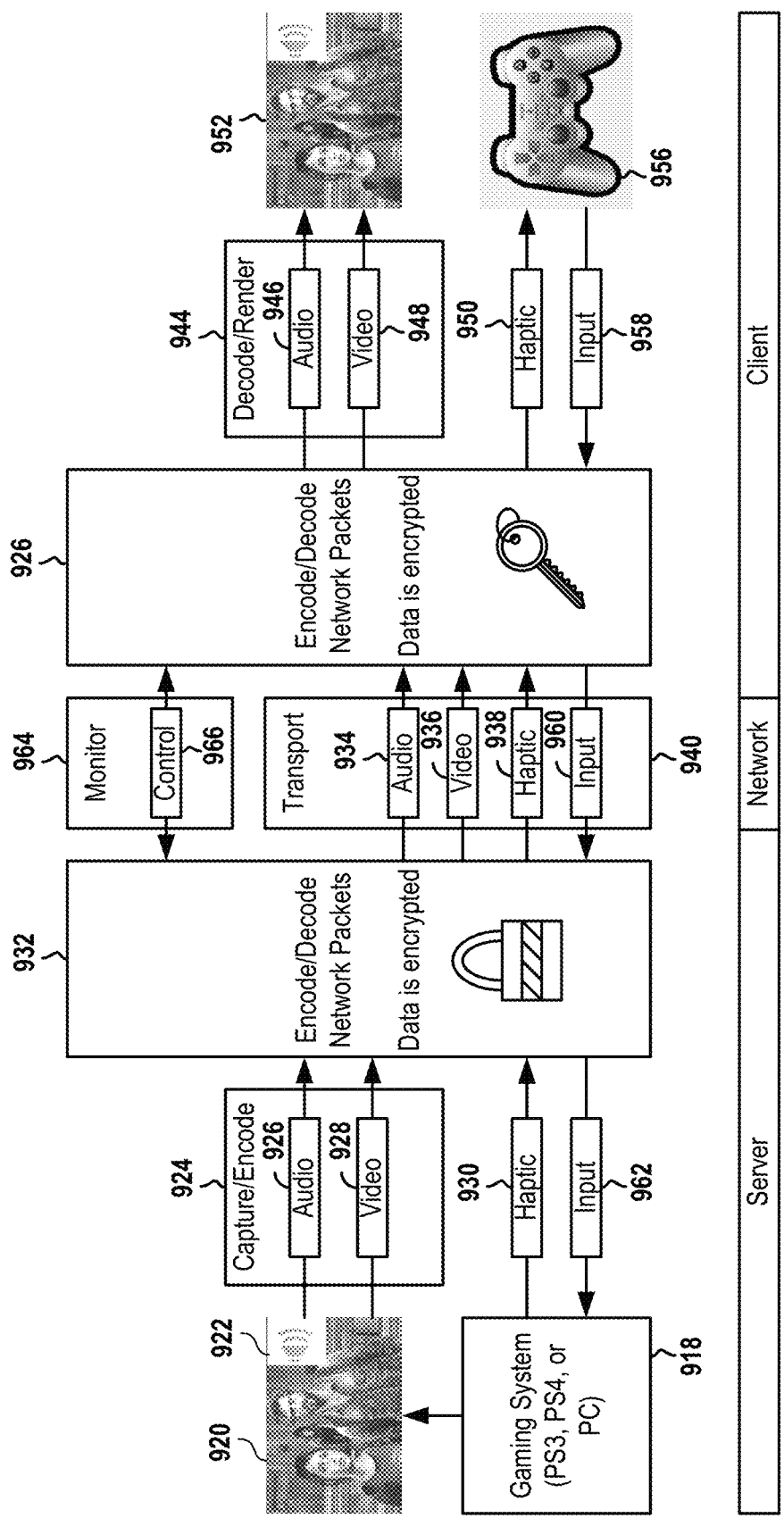
FIG. 9B is a flow diagram conceptually illustrating various operations which are performed for streaming a cloud video game to a client device, in accordance with implementations of the disclosure.

FIG. 9B is a flow diagram conceptually illustrating various operations which are performed for streaming a cloud video game to a client device, in accordance with implementations of the disclosure. The gaming system 918 executes a video game and generates raw (uncompressed) video 920 and audio 922. The video 920 and audio 922 are captured and encoded for streaming purposes, as indicated at reference 924 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 926 and encoded video 928 are further packetized into network packets, as indicated at reference numeral 932, for purposes of transmission over a network such as the Internet. The network packet encoding process can also employ a data encryption process, thereby providing enhanced data security. In the illustrated implementation, audio packets 934 and video packets 936 are generated for transport over the network, as indicated at reference 940.

The gaming system 918 additionally generates haptic feedback data 930, which is also packetized into network packets for network transmission. In the illustrated implementation, haptic feedback packets 938 are generated for transport over the network, as further indicated at reference 940.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 940, the audio, video, and haptic feedback packets are transported over a network, such as and/or including the Internet. As indicated at reference 942, the audio packets 934, video packets 936, and haptic feedback packets 938, are decoded/reassembled by the client device to define encoded audio 946, encoded video 948, and haptic feedback data 950 at the client device. If the data has been encrypted, then the network packets are also decrypted. The encoded audio 946 and encoded video 948 are then decoded by the client device, as indicated at reference 944, to generate client-side raw audio and video data for rendering on a display device 952. The haptic feedback data 950 can be processed/communicated to produce a haptic feedback effect at a controller device 956 or other interface device through which haptic effects can be rendered. One example of a haptic effect is a vibration or rumble of the controller device 956.

It will be appreciated that a video game is responsive to user inputs, and thus, a similar procedural flow to that described above for transmission and processing of user input, but in the reverse direction from client device to server, can be performed. As shown, a user operating controller device 956 may generate input data 958. This input data 958 is packetized at the client device for transport over the network to the cloud gaming system. The input data packets 960 are unpacked and reassembled by the cloud gaming server to define input data 962 on the server-side. The input data 962 is fed to the gaming system 918, which processes the input data 962 to update the game state of the video game.

During transport (ref. 940) of the audio packets 934, video packets 936, and haptic feedback packets 938, the transmission of data over the network can be monitored to ensure the cloud game stream quality of service. For example, network conditions can be monitored as indicated by reference 964, including both upstream and downstream network bandwidth, and the game streaming can be adjusted in response to changes in available bandwidth. That is, the encoding and decoding of network packets can be controlled based on present network conditions, as indicated by reference 966.

Figure 10:
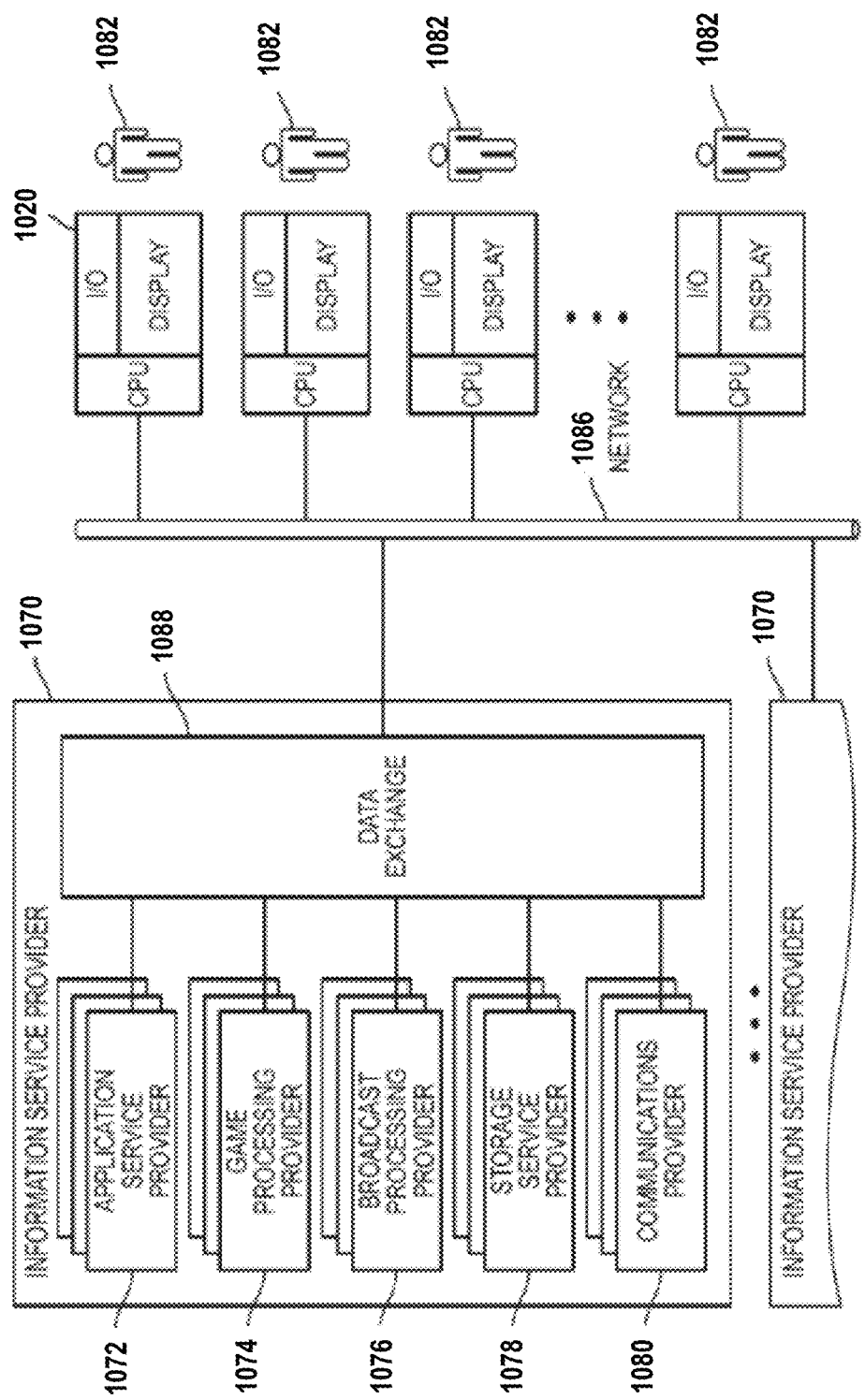
FIG. 10 illustrates an embodiment of an Information Service Provider architecture, in accordance with implementations of the disclosure.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
    receiving a request to initiate gameplay of a video game, the gameplay being configured to occur in a virtual environment resembling a requested real-world location;
    responsive to the request, obtaining exterior data associated to the requested real-world location, the exterior data describing external structures of physical objects in the requested real-world location;
    using a trained machine learning model to infer interior data for the physical objects based on the exterior data, the interior data describing inferred internal structures of the physical objects;
    generating the virtual environment using the exterior data and the interior data;
    wherein the physical objects include a plurality of buildings, wherein the exterior data describes exterior surfaces of the buildings, and wherein the interior data describes interior layouts or interior furnishings of the buildings, said interior layouts or interior furnishings being inferred by the trained machine learning model, based on the exterior surfaces of the buildings, to have a style consistent with said exterior surfaces of the buildings;
    initiating gameplay of the video game in the generated virtual environment.

2. The method of claim 1, wherein the exterior data includes external three-dimensional geometry of the physical objects.

3. The method of claim 1, wherein the exterior data includes external image data associated to surfaces of the external three-dimensional geometry.

4. The method of claim 1, wherein the interior data includes inferred internal three-dimensional geometry of the physical objects.

5. The method of claim 1, wherein the generated virtual environment enables the gameplay to include interactivity with the interior layouts and the interior furnishings of the buildings.

6. The method of claim 1, wherein the trained machine learning model further infers the interior data based on geolocation data associated to the real-world location.

7. The method of claim 6, wherein the geolocation data identifies one or more of a country, state, city, town, or neighborhood.

8. The method of claim 1, wherein the generated virtual environment simulates the requested real-world location.

9. A non-transitory computer-readable medium having program instructions embodied thereon that, when executed by at least one computing device, cause said computing device to perform a method including the following operations:
- receiving a request to initiate gameplay of a video game, the gameplay being configured to occur in a virtual environment resembling a requested real-world location;
- responsive to the request, obtaining exterior data associated to the requested real-world location, the exterior data describing external structures of physical objects in the requested real-world location;
- using a trained machine learning model to infer interior data for the physical objects based on the exterior data, the interior data describing inferred internal structures of the physical objects;
- generating the virtual environment using the exterior data and the interior data;
- wherein the physical objects include a plurality of buildings, wherein the exterior data describes exterior surfaces of the buildings, and wherein the interior data describes interior layouts or interior furnishings of the buildings, said interior layouts or interior furnishings being inferred by the trained machine learning model, based on the exterior surfaces of the buildings, to have a style consistent with said exterior surfaces of the buildings;
- initiating gameplay of the video game in the generated virtual environment.

10. The non-transitory computer-readable medium of claim 9, wherein the exterior data includes external three-dimensional geometry of the physical objects.

11. The non-transitory computer-readable medium of claim 9, wherein the exterior data includes external image data associated to surfaces of the external three-dimensional geometry.

12. The non-transitory computer-readable medium of claim 9, wherein the interior data includes inferred internal three-dimensional geometry of the physical objects.

13. The non-transitory computer-readable medium of claim 9, wherein the generated virtual environment enables the gameplay to include interactivity with the interior layouts and the interior furnishings of the buildings.

14. The non-transitory computer-readable medium of claim 9, wherein the trained machine learning model further infers the interior data based on geolocation data associated to the real-world location.

15. The non-transitory computer-readable medium of claim 14, wherein the geolocation data identifies one or more of a country, state, city, town, or neighborhood.

16. The non-transitory computer-readable medium of claim 9, wherein the generated virtual environment simulates the requested real-world location.

* * * * *